United States Patent Office 3,637,690
Patented Jan. 25, 1972

3,637,690
TETRAZOLO PYRIDAZINES
Paul L. Anderson, Denville, and William J. Houlihan and Robert E. Manning, Mountain Lakes, N.J., assignors to Sandoz-Wander, Inc., Hanover, N.J.
No Drawing. Filed Apr. 4, 1969, Ser. No. 813,695
Int. Cl. C07d 51/04
U.S. Cl. 266—250
3 Claims

ABSTRACT OF THE DISCLOSURE

Alkenylamino tetrazolo pyridazines, e.g., 6-chloro-8-$\beta$-methallylamino tetrazolo[1,5-b]pyridazine, are useful as hypotensives.

This invention pertains to novel heterocyclic compounds. More particularly it pertains to 6-chloro-tetrazolo pyridazines substituted at the 8-position with an alkenylamino moiety, processes therefor and acid addition salts thereof.

The compounds of this invention may be represented by the formula

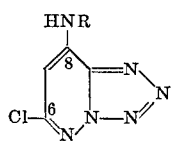
(I)

where R represents lower alkenyl, particularly alkenyl having 3–5 carbon atoms, e.g., allyl, methallyl and the like.

The compounds of Formula I may be prepared according to the following reaction scheme.

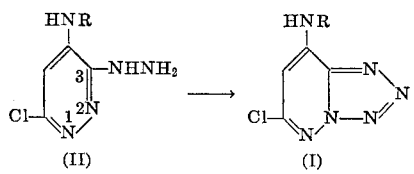

where R is as defined above.

The above reaction for preparing the Compounds I is carried out by treating the substituted 6-chloro-3-hydrazino pyridazine (II) or an acid addition salt thereof with strong mineral acid, such as hydrohalic acid, e.g., hydrochloric acid or hydrobromic acid, or sulfuric acid, phosphoric acid and the like, and treating the resulting mixture with an alkali or an alkaline earth metal nitrite, e.g., sodium nitrite. The reaction is conducted in solvent and an aqueous solvent, especially water, is preferred. The reaction may be conducted at temperatures of 10–50° C., preferably 20–35° C. Neither the reaction temperatures nor the solvents used are critical in obtaining the tetrazolo pyridazines (I). The product may then be recovered using conventional techniques such as filtration and recrystallization.

The Compounds I may be converted to and from the free base and the acid addition salt forms using conventional techniques, such as by salifying the free base and by treating the salt with a base, e.g., sodium carbonate.

The pyridazines (II) may be prepared according to the following reaction scheme, in which R has the above significance.

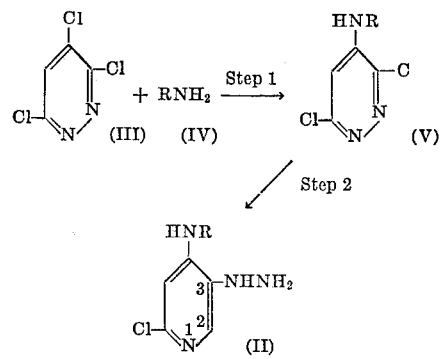

The pyridazines (V) are prepared according to Step 1 by treating 3,4,6-trichloropyridazine (III) (a known compound) with an appropriate amine (IV) in inert solvent at a temperature of about 0 to 50° C., preferably 20 to 30° C. for about 1 to 24 hours. Solvents which may be used include lower alkanols, such as methanol, ethanol or isopropanol. When feasible, excess reactant (IV) may also be used as solvent. Neither the solvent nor the reaction temperature is critical. The compounds V are recovered using conventional techniques.

The amines of Formula IV are known and are prepared according to methods disclosed in the literature.

Step 2 is conducted by treating the pyridazines (V) with hydrazine at a temperature of about 20 to 115° C., preferably 80 to 115° C. for about 1 to 4 hours. Use of solvent is not necessary, although excess hydrazine or solvents such as methanol or ethanol may be used if desired. The temperature of reaction is not critical. The product (II) is recovered using conventional techniques.

The pyridazines represented by Formula I are useful because they possess pharmacological activity in animals. In particular, these compounds are useful as hypotensives, as indicated by their activity in renal hypertensive rat given 30 mg./kg. of active compound using the technique of A. Grollman (Proc. Soc. Exptl. Biol. and Med. 57: 102, 1944) and indirectly measuring the blood pressure from the caudal artery in the tail using a pneumatic pulse transducer. When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the Compounds I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate, and the like.

In general, satisfactory results are obtained when these compounds are administered at a daily dosage of about 3.0 milligram to about 100 milligrams per kilogram of animal body weight. This daily dosage is preferably administered 2 to 4 times a day, or in sustained release form. For most large mammals such as primate, the total daily dosage is from about 50 milligrams to about 700 milligrams. Dosage forms suitable for internal use comprise from about 10 milligrams to about 350 milligrams of the active compound in intimate admixture with a solid or liquid pharmaceutically acceptable carrier or diluent.

A representative formulation suitable for oral administration is a tablet prepared by standard tabletting techniques which contains the following:

| Ingredients: | Parts by weight |
|---|---|
| 8 - allylamino - 6 - chloro tetrazolo[1,5-b]pyridazine | 10 |
| Tragacanth | 2 |
| Lactose | 79.5 |
| Cornstarch | 5 |
| Talcum | 3 |
| Magnesium stearate | 0.5 |

EXAMPLE 1

8-allylamino-6-chloro tetrazolo[1,5-b]pyridazine

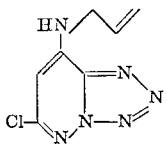

To a stirred suspension of 20.0 g. of 4-allylamino-6-chloro-3-hydrazino-pyridazine in 300 ml. of water is added 9.4 ml. of concentrated hydrochloric acid solution. The mixture is cooled and 8.35 g. of sodium nitrite in 25 ml. of water is added slowly. The mixture is allowed to warm up to room temperature and is then stirred overnight. The product is filtered, washed with water, and recrystallized from methanol to give 8-allylamino-6-chloro tetrazolo[1,5-b]pyridazine; M.P. 158°–159° C.

EXAMPLE 2

6-chloro-8-β-methallylamino tetrazolo[1,5-b]pyridazine

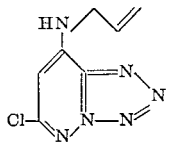

To a stirred suspension of 5.34 g. of 6-chloro-3-hydrazino-4-methallylamino pyridazine in 60 ml. of water is added 2.5 ml. of concentrated hydrochloric acid solution. The mixture is cooled and 2.28 g. of sodium nitrite in 25 ml. of water is added slowly. The mixture is allowed to warm up to room temperature and is then stirred overnight. The product is filtered, washed with water, and recrystallized from methanol to give 6-chloro-8-β-methallylamino tetrazolo[1,5-b]pyridazine; M.P. 147°–149° C.

What is claimed is:

1. A compound of the formula

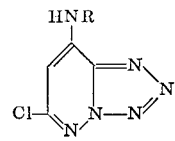

where R represents alkenyl having 3 to 5 carbon atoms, or a non-toxic pharmaceutically acceptable acid addition salt thereof.

2. The compound according to claim 1 which is 8-allylamino-6-chloro tetrazolo[1,5-b]pyridazine.

3. The compound according to claim 1 which is 6-chloro-8-β-methallylamino tetrazolo[1,5-b]pyridazine.

References Cited

Chemical Abstracts, vol. 70, No. 13, pp. 378–379 (1959).

NICHOLAS S. RIZZO, Primary Examiner

U.S. Cl. X.R.

424—250